(No Model.)
S. B. PIERCE.
SAW MILL ROLLER.
No. 314,470. Patented Mar. 24, 1885.
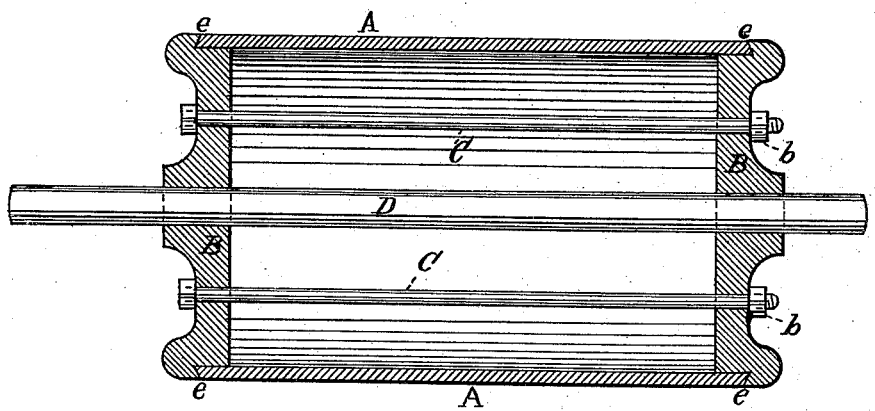
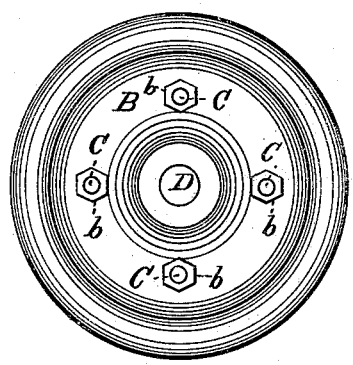
Witnesses.
S. E. W. Bewley.
Clarence P. Levy.
Inventor
Samuel B. Pierce.
per Thomas J. Bewley, atty

UNITED STATES PATENT OFFICE.

SAMUEL B. PIERCE, OF NORTH LA CROSSE, WISCONSIN.

SAW-MILL ROLLER.

SPECIFICATION forming part of Letters Patent No. 314,470, dated March 24, 1885.

Application filed October 3, 1884. (No model.)

*To all whom it may concern:*

Be it known that I, SAMUEL B. PIERCE, a citizen of the United States, residing at North La Crosse, in the county of La Crosse and State of Wisconsin, have invented a new and useful Improvement in Saw-Mill Rollers, of which the following is a specification.

The object of my invention is the construction of a roller for use in saw-mills that shall be durable, cheap to manufacture, and capable of withstanding either weight or pressure that may be exerted upon it when in use; and the invention relates to an improvement in rollers for saw-mills which are used to feed the board or plank to the vertical reciprocating saw or to the circular saw in resawing lumber which are known in such application as "pressure-rollers." Single rollers of the same construction may be used for conveying logs or slabs either from the saw or to any point of the mill or yard, in which case they may turn in bearings of a frame; or they may be constructed without journals, as may best suit convenience.

The improvement consists of a roller in which the cylinder is composed of wrought-iron sufficiently thick to withstand any strain that may be exerted upon it, firmly connected between two cast-iron heads or ends by means of screw-bolts, that extend from end to end of the roller and unite the parts. The ends of the cylinder on the outer surface are beveled or chamfered to a feather edge, and the heads have a corresponding inward-beveled flange or rabbet on the peripheries of their inner surfaces, into which the said beveled ends of the cylinder fit closely, a shaft being centrally arranged with said roller throughout its length, the ends of which turn in bearings that are connected to the housings or frame of the saw, as hereinafter fully described.

In the accompanying drawings, which make a part of this specification, Figure is a longitudinal section of my improved roller. Fig. 2 is an end view.

Like letters of reference in both the figures indicate the same parts.

A is the cylindrical wrought-iron shell of the roller, which I usually make of heavy boiler-iron.

B B are the cast-iron heads or ends, between which the cylinder A is placed and the parts firmly connected together by means of the screw-bolts C and nuts b.

The ends of the cylinder A on the outer surface are beveled to a feather edge, and the heads B B have a corresponding beveled flange or circular rabbet on the peripheries of their inner surfaces, into which said beveled ends of the cylinder fit closely. (Seen clearly in Fig. 1 of the drawings.) This construction and connection of the parts adds strength to the cylinder, and when drawn together by means of the screw-bolts C and nuts b on the ends thereof form a compact rigid roller, well adapted to withstand strain and the hard usage to which saw-mill rollers are subjected. Besides, it also permits of a parallel connection of the cylinder and its heads throughout the entire length of the roller.

D is the central shaft, which passes through the roller from end to end and has a close fit in central openings in the heads B. The ends of the shaft project externally from the heads B a sufficient distance to form journals that turn in bearings that are attached to the housings or standing frame of the saw-mill.

The pair of rollers, as described, between which the board or plank to be sawed is placed, or the single rollers for carrying lumber, are actuated by any suitable mechanism for feeding to or from the saw.

The cylinder A is formed of heavy boiler-iron or of welded wrought-iron tubing of sufficient thickness to resist any strain that may be exerted upon it by the pressure in feeding said plank between a pair of the rollers to the saw or to resist the weight of heavy timber. When the cylinder A is constructed of a sheet of boiler-iron bent into its proper form, a welt or strip of the same material is riveted on the inner surface the entire length of the seam, which will add greatly to the capacity for resisting pressure and effectually unite the adjoining edges of the sheet. I would generally, however, prefer lap-welded tubing as being more economical in the cost of construction.

I am aware that saw-mill rollers have been constructed with their cylindrical bearing-surfaces composed of wrought-iron and their heads of cast-iron, connected together by means of screw bolts and nuts; but the heads are made like a truncated cone and inserted within each end of the cylinder. This form of construction is objectionable, as this shaped head, when drawn tightly into the cylinder, is liable to crack or split, and there is nothing to protect the end of the cylinder from a blow struck thereon. These objections are overcome by my mode of construction, and I form a rigid roller capable of withstanding the rough usage to which such rollers are subjected; but What I do claim as my invention, and desire to secure by Letters Patent, is—

The saw-mill roller herein described, composed of the wrought-iron cylinder A, having its ends chamfered or beveled, and the cast-iron heads B B, provided with beveled circular recesses, in which the ends of the cylinder fit, the parts A B B being held together by means of the screw-bolts C and nuts $b$, substantially in the manner and for the purpose specified.

SAMUEL B. PIERCE.

Witnesses:
W. W. SMITH,
JOHN C. HILL.